Figure 1:
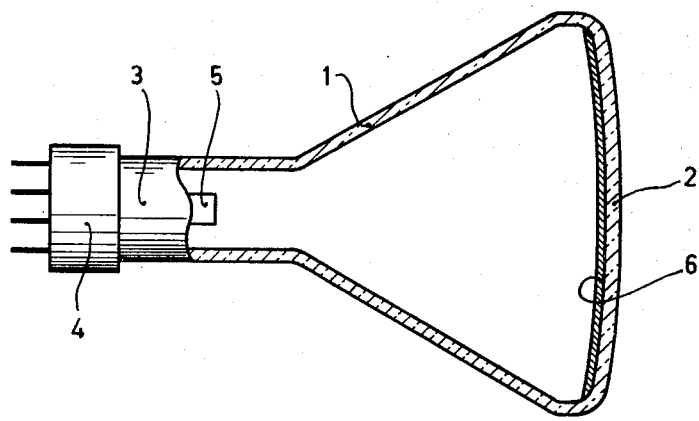

United States Patent [19]

Schuil

[11] 3,868,533

[45] Feb. 25, 1975

[54] CATHODE-RAY TUBE FOR IMAGE DISPLAY

[75] Inventor: Roelof Egbert Schuil, Emmasingel, Eindhoven, Netherlands

[73] Assignee: U.S. Philips Corporation, New York, N.Y.

[22] Filed: Mar. 6, 1974

[21] Appl. No.: 448,655

[30] Foreign Application Priority Data

Mar. 8, 1973 Netherlands................... 7303250

[52] U.S. Cl............................ 313/468, 252/301.4 S
[51] Int. Cl........................ C09k 1/14, H01j 29/20
[58] Field of Search .............. 252/301.4 S; 313/468

[56] References Cited
UNITED STATES PATENTS

| | | | |
|---|---|---|---|
| 3,418,246 | 12/1968 | Royce | 252/301.4 S |
| 3,418,247 | 12/1968 | Yocom | 252/301.4 S |
| 3,706,666 | 12/1972 | Schuil | 252/301.4 S |
| 3,725,704 | 4/1973 | Buchanan et al. | 252/301.4 S X |
| 3,738,856 | 6/1973 | Masi | 252/301.4 S X |

Primary Examiner—Jack Cooper
Attorney, Agent, or Firm—Frank R. Trifari; Norman N. Spain

[57] ABSTRACT

Cathode-ray tube for monochrome image display, in particular black-and-white image display. The tube has a luminescent screen which contains a terbium- and samarium-activated oxysulphide according to the formula $(M_{1-x-y}Tb_xSm_y)_2 O_2S$, where M is at least one of the elements yttrium, gadolinium, lanthanum and lutetium, and $0.003 \leq x \leq 0.030$ and $0.0001 \leq y \leq 0.005$. Up to 90 atomic per cent of the terbium may be replaced by dysprosium.

4 Claims, 2 Drawing Figures

CATHODE-RAY TUBE FOR IMAGE DISPLAY

The invention relates to a cathode-ray tube for monochrome display, in particular black-and-white display, of images.

In black-and-white image display by means of cathode-ray tubes a luminescent layer is used which is applied to the display screen of the tube and in general comprises a mixture of two luminescent materials which each emit in a given part of the spectrum, so that the overall visual effect of the emitted light is white. The two luminescent materials usually are selected from the group of the sulphides, because the latter have a very high energy conversion efficiency. A frequently used combination is, for example, a yellow-emitting silver-activated zinc cadmium sulphide and a blue-emitting silver-activated zinc sulphide.

A disadvantage of the use of such a mixture of two luminescent materials is that owing to a not perfectly homogeneous structure of the luminescent screen local differences in the colour of the emitted light may occur. This inhomogeneity obviously is likely to occur if in the manufacture of the screen an inhomogeneous mixture of luminescent materials is used. The provision of the luminescent screen in a cathode-ray tube usually is effected by means of a suspension which contains the two luminescent materials. It has been found that the rates of settling of the two luminescent materials may be different, which gives rise to inhomogeneity of the screen. An important cause of color variation in the emitted light is the occurrence of thickness variations in the settled luminescent layer. In general the luminescent layer is thicker at the centre of the screen than at the edges. The thicker the layer, the more the radiation emitted by the blue-luminescent material is absorbed. This results in a troublesome yellow discoloration of the image at the centre of the screen.

The said disadvantages may be eliminated or at least reduced by taking special precautions in the manufacture of the luminescent screens. However, these precautions considerably increase the manufacturing costs of such screens.

The luminescent sulphides have further disadvantages due to their chemical and physical properties. For example, they are highly sensitive to copper impurities, which cause undesirable shifting of the spectral distribution of the emitted light. Moreover at comparatively high current densities of the exciting electrons they will rapidly be saturated, which renders high brightness impossible. In addition, it is found that the chromaticity point of the emitted radiation is not constant with variation of the excitation density, so that colour differences occur between the very bright and less bright parts of the image displayed.

In order to avoid the disadvantages attendant on luminescent screens comprising mixtures of luminescent sulphides attempts have been made to find luminescent materials which have a spectral distribution of the emitted radiation such that the visual effect of the emission colour is white. Such luminescent materials enable screens to be manufactured which have only one luminescent constituent and the visual effect of the emission of which is white. Furthermore, in order to avoid the disadvantages inherent in luminescent sulphides the said white-luminescent material preferably should not be a sulphide.

It has already been proposed to use for this purpose a luminescent terbium-activated oxysulphide of at least one of the rare-earth elements yttrium, gadolinium, lanthanum and lutetium. The luminescent rare-earth oxysulphides (in this connection yttrium is reckoned amongst the rare-earth elements) are known, for example from British Patent Specification Nos. 1,121,055 and 1,131,956. The oxysulphides described in these specifications contain as an activator one of the elements dysprosium, erbium, europium, holmium, neodymium, praseodymium, samarium, terbium or thulium. The terbium-activated oxysulphide which has a high energy conversion efficiency exhibits a blue emission at very low terbium concentrations. However, the use of higher contents of terbium yields materials the emission colors of which are shifted towards the green part of the spectrum. At comparatively high terbium concentrations materials having a very bright green emission are obtained. Between the said two limiting values of the terbium concentration there is an intermediate range of concentrations at which the oxysulphide has a substantially white emission color. These materials may be used in the luminescent layer of a cathode-ray tube for black-and-white imate display.

A large disadvantage of the oxysulphides which have contents of terbium in the said intermediate range is that the emitted light has a color aspect which many viewers experience as unpleasant. In actual fact the emitted radiation has a highly unsaturated green-blue color the chromaticity point of which in the CIE color point diagram lies outside the area in which most viewers prefer the color of the emitted radiation to be in monochrome image display. This renders these oxysulphides unsuitable for the intended use in practice.

It is an object of the present invention to provide luminescent terbium-activated oxysulphides the emitted radiation of which has a white color and a chromaticity point which is highly suitable for cathode-ray tubes for black-and-white image display.

A cathode-ray tube according to the invention for monochrome image display, in particular black-and-white display, is provided with a luminescent screen which contains a luminescent terbium-activated oxysulphide of at least one of the elements yttrium, gadolinium, lanthanum and lutetium and is characterized in that the oxysulphide contains samarium as a second activator and satisfies the formula $(M_{1-x-y}Tb_xSm_y)_2O_2S$, where M is at least one of the elements yttrium, gadolinium, lanthanum and lutetium, and $0.003 \leq x \leq 0.030$
$0.0001 \leq y \leq 0.005$ A cathoderay tube according to the invention contains an oxysulphide which is activated both with terbium and with samarium. Under electron excitation this luminescent material proves to have an emission color the chromaticity point of which lies within the area desirable for black-and-white image display, if the concentrations of the terbium and the samarium, i.e. $x$ and $y$ respectively, are selected to lie within the said area. A cathode-ray tube according to the invention has the advantages attendant on the use of a single luminescent constituent, namely a perfectly homogeneous screen structure. The brightnesses obtainable with such a cathode-ray tube are comparable to those obtained with tubes which contain a mixture of luminescent sulphides. A cathode-ray tube according to the invention has the further advantage of a neutrally white daylight colour of the screen, which in general is highly desirable. In addition the luminescent materials in a tube according to the invention prove to be insensitive to copper contamination. A further advantage of the said materials is that they have a current saturation which is low compared with that of the sulphides, so that in the tubes according to the invention higher excitation densities are permissible and hence higher brightnesses are obtainable.

It has been found that the addition of samarium to a luminescent oxysulphide which is activated with a given amount of terbium yields a material which on excitation by electrons emits a comparatively greater amount of radiation in the red part of the spectrum. With increase in the samarium content especially the X-value of the chromaticity point of the radiation emitted by the oxysulphide is found to increase. With respect to the terbium added as an activator it is found that increase in the terbium content causes the green terbium emission at about 545 nm to 550 nm to increase in a comparatively high degree. This increase is mainly at the expense of the blue terbium lines in the range between 385 nm and 490 nm and in a considerably lesser degree at the expense of the terbium lines in the orange-red range between 585 nm and 625 nm. Thus the effect of an increasing terbium content mainly is an increase in the Y-value of the chromaticity point of the emitted radiation.

A particular advantage of a cathode-ray tube according to the invention is that the chromaticity point of the emitted radiation may at will be adjusted within the region desired for black-and-white display by suitably selecting the terbium and samarium contents.

in a luminescent oxysulphide according to the invention the samarium itself provides only a small contribution to the emission in the red part of the spectrum. The chromaticity point shift produced by the addition of samarium to the terbium-activated oxysulphide terefore is not due to a complementation of the terbium spectrum by the samarium spectrum. Surprisingly it has been found that the samarium rather causes attenuation of the blue terbium emission in favour of the green and red terbium emissions. It has been found that at higher samarius contents the green-blue terbium emission and possibly even the green terbium emission are attenuated in favor of the red terbium lines.

A preferred embodiment of a cathode-ray tube according to the invention contains a terbium and samarium activated oxysulphide in which part of the terbium up to at most 90 atomic per cent is replaced by a substantially equal amount of dysprosium. It has been found that the dysprosium greatly stimulates the green terbium emission (545 nm to 550 nm), whilst the blue terbium lines and, to a far lesser degree, the red terbium lines decrease. An increasing dysprosium content has substantially the same effect as an increasing terbium content, i.e., an increase in the Y-value of the chromaticity point of the emitted radiation. Thus highly efficient green-luminescent materials are obtainable. However, an oxysulphide activated with terbium and dysprosium similarly to the terbium-activated oxysulphides has a chromaticity point which is unsuitable for black-and-white image display. In this case also, addition of samarium is required to obtained the desired chromaticity. Partial replacement of the terbium by dysprosium in a luminescent material according to the invention is advantageous, because dysprosium is much cheaper than terbium. Replacement of more than 90 atomic per cent of the terbium is not used, because it renders correction of the terbium spectrum by means of the addition of samarium difficult or even impossible.

A preferred cathode-ray tube according to the invention contains a luminescent oxysulphide of the aforementioned general formula in which the element denoted by M is yttrium and/or gadolinium, for the oxysulphides of yttrium and/or gadolinium yield the highest brightnesses.

The luminescent oxysulphides according to the invention can be prepared by the methods generally known for preparing such materials. Manufacture may start, for example, with a mixture of the oxides of the elements denoted by M and of terbium and samarium or of a mixed oxide of the said elements together with a sulphide and/or polysulphide of an alkali metal. This mixture is heated in a closed crucible to a temperature of, for example, for 800°C to 1400°C, during which heating the luminescent material is produced by a solid-state reaction.

Figure 2:
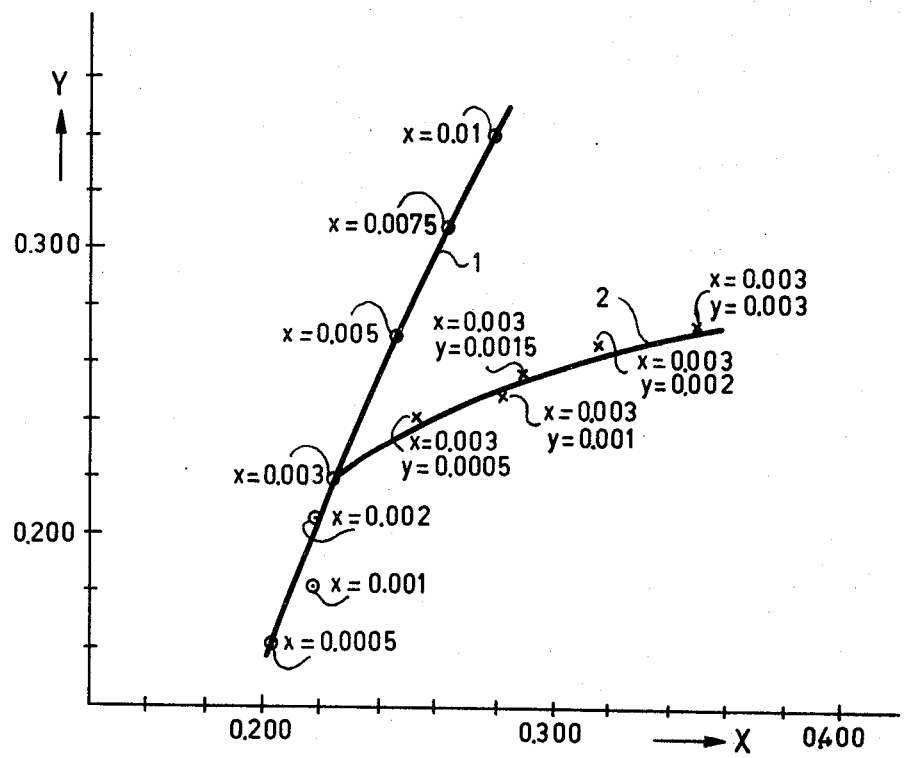

The various features and advantages of the present invention will be apparent from the following description of exemplary embodiments thereof and measurements, taken in conjunction with the accompanying drawings, in which FIG. 1 shows schematically and partly in section a cathode-ray tube according to the invention, and FIG. 2 shows in a chromaticity diagram the influence of the terbium and samarium contents on the chromaticity of the radiation emitted by the oxysulphides according to the invention.

Referring now to FIG. 1, reference numeral 1 denotes the evacuated glass envelope of a cathode-ray tube according to the invention. The envelope 1 comprises a display screen 2 at one end and a cylindrical smaller-diameter portion 3 at the other end which is secured in a base 4. The portion 3 contains the electrodes of an electron gun 5 which serves to produce an electron beam. The display screen 2 is internally coated with a luminescent layer 6 which contains a terbium and samarium activated oxysulphide according to the invention and is excited by the electron beam from the gun 5.

In order to determine the influence of the terbium content on the emission of a luminescent oxysulphide some oxysulphides activated with terbium only (not according to the invention) were prepared, for example the materials:

A. $(Y_{0.997} Tb_{0.003})_2 O_2S$
B. $(Y_{0.990} Tb_{0.010})_2 O_2S$.

Furthermore materials according to the invention which contain both terbium and samarium as activators were prepared, for example:

C. $(Y_{0.996} Tb_{0.003} Sm_{0.001})_2 O_2S$.

The influence of dysprosium on the terbium emission can be shown by means of a compound containing no samarium (not according to the invention) which is analogous to the material A but in which 33 atomic per cent of the terbium are replaced by dysprosium:

D. $(Y_{0.997} Tb_{0.002} Dy_{0.001})_2 O_2S$.

The emission spectra of the substances A to D under electron excitation were measured. The following Table shows the relative energies of the terbium emission lines in the visible spectrum. For each material the peak height of the terbium line at 545 nm is set at 100.

| material $\lambda_{(nm)}$ | 385 | 417 | 440 | 457 | 475 | 485 | 490 | 545 | 550 | 587 | 591 | 620 | 623 |
|---|---|---|---|---|---|---|---|---|---|---|---|---|---|
| A | 65.5 | 139 | 107 | 29.15 | 43.5 | 32 | 26.5 | 100 | 47 | 33 | 18.5 | 19.5 | 23.5 |
| B | 23 | 46.5 | 31.5 | 8.5 | 16 | 10.5 | 22.5 | 100 | 46 | 30.5 | 17 | 18 | 20.5 |
| C | 36 | 81.5 | 64.5 | 17.5 | 27.5 | 20.5 | 22 | 100 | 46.5 | 35 | 20.5 | 22 | 26 |
| D | 38 | 84.5 | 68 | 18.5 | 26.5 | 18.5 | 25 | 100 | 46.5 | 35 | 19 | 21 | 22.5 |

A comparison between the measurements made on the materials A and B shows that an increase of the terbium content in a terbium-activated oxysulphide results in a relative increase of the green terbium emission. This relative increase is at the expense of the blue terbium emission and also, in a small part, at the expense of the red terbium emission. A comparison between the measurements made on the materials A and C clearly shows the influence of samarium on the terbium emission in the materials according to the invention. The terbium emission is decreased from the ultraviolet end of the spectrum in favor of the green terbium lines but also in favor of the red terbium lines (585 nm to 625 nm). Finally a comparison of the measurements on the materials A and D shows that partial substitution of dysprosium for terbium has substantially the same effect as increase of the terbium concentration: the intensity of the blue terbium lines is reduced, whilst in comparison the green terbium emission is greatly increased. The radiation intensity in the red part of the spectrum relative to the green terbium line is substantially the same for the material D and for the material A.

The chromaticity points of a number of yttrium oxysulphides containing no samarium (not according to the invention) and having the following terbium contents:

$x = 0.0005$
$x = 0.0010$
$x = 0.0020$
$x = 0.0030$ (material A)
$x = 0.0050$
$x = 0.0075$
$x = 0.0100$ (material B)

were determined. The chromaticity points of the following luminescent oxysulphides according to the invention were also measured:

($Y_{0.9965}$ $Tb_{0.0030}$ $Sm_{0.0005}$)$_2$ $O_2S$
($Y_{0.9960}$ $Tb_{0.0030}$ $Sm_{0.0010}$)$_2$ $O_2S$ (material C)
($Y_{0.9955}$ $Tb_{0.0030}$ $Sm_{0.0015}$)$_2$ $O_2S$
($Y_{0.9950}$ $Tb_{0.0030}$ $Sm_{0.0020}$)$_2$ $O_2S$
($Y_{0.9940}$ $Tb_{0.0030}$ $Sm_{0.0030}$)$_2$ $O_2S$.

The X and Y coordinates of the chromaticity points of the above substances were plotted in the chromaticity diagram of FIG. 2. In the diagram the X coordinate is plotted along the horizontal axis and the Y coordinate along the vertical axis. A line 1 interconnects the chromaticity points of the materials which contain terbium only and a line 2 interconnects the chromaticity points of the materials according to the invention which all contain 0.003 mol of terbium and an increasing amount of samarium. The diagram shows that an increase of the terbium content mainly results in an increase of the Y coordinate, and that an increase of the samarium content mainly results in an increase of the X coordinate, of the chromaticity point. The diagram further shows that a suitable choice of the terbium and samarium contents enables any desired chromaticity point within a comparatively large range to be obtained.

It should be noted that by means of the materials according to the invention chromaticity points of the emitted radiation are obtainable which cover a considerably larger area in the diagram than is desired in general for black-and-white image display. Obviously this wide latitude of choice in itself is an advantage and in practice frequently proves to be highly desirable, because it enables the influence of the transmission of the glass of the display screen to be readily eliminated, for color shifts due to the said transmission can be corrected by using a luminescent oxysulphide of a composition such that the chromaticity point does not lie in the desired area but that the light after transmission by the glass screen has the correct color.

Finally it should be mentioned that a cathoderay tube according to the invention is suitable not only for black-and-white display but also for monochrome color image display, for by using suitable filters images in different color are obtainable.

What is claimed is:

1. Cathode-ray tube for black-and-white image display, provided with a luminescent screen which contains a luminescent terbiumactivated oxysulphide of at least one of the elements yttrium, gadolinium, lanthanum and lutetium, characterized in that the oxysulphide also contains samarium as an activator and satisfies the formula $(M_{1-x-y} Tb_x Sm_y)_2 O_2S$, where M is at least one of the elements yttrium, gadolinium, lanthanum and lutetium, and $0.003 \leq x \leq 0.030$ and $0.0001 \leq y \leq 0.005$, said oxysulfide exhibiting a white color emission under cathode ray excitation.

2. Cathode-ray tube as claimed in claim 1, characterized in that up to 90 atomic per cent of the terbium is replaced by dysprosium.

3. Cathode-ray tube as claimed in claim 2, characterized in that M is yttrium and/or gadolinium.

4. Cathode-ray tube as claimed in claim 1 characterized in that M is yttrium and/or gadolinium.

* * * * *